J. P. KIPP.
PIPE JOINT FASTENER.
APPLICATION FILED AUG. 10, 1920.

1,373,249.

Patented Mar. 29, 1921.

Inventor
J. P. Kipp.

By Geo. P. Kimmel
Attorney

UNITED STATES PATENT OFFICE.

JOHN PHILIP KIPP, OF DETROIT, MICHIGAN.

PIPE-JOINT FASTENER.

1,373,249. Specification of Letters Patent. Patented Mar. 29, 1921.

Application filed August 10, 1920. Serial No. 402,577.

*To all whom it may concern:*

Be it known that I, JOHN PHILIP KIPP, a citizen of the United States, residing at Detroit, in the county of Wayne and State of Michigan, have invented certain new and useful Improvements in Pipe-Joint Fasteners, of which the following is a specification.

This invention has for its object to provide a connection or fastener for the adjacent ends of sections of stove pipes to effectively prevent withdrawal of one pipe section from the other and further to reliably maintain the sections in proper alinement, thereby preventing sagging at the joints and eliminating the necessity of use for supporting wires.

A further object is the provision of a device of this character embodying features of simplicity affording its economical manufacture and possessing novel structural details permitting of its quick and convenient application to use and also of its utilization in perforating the pipe for the accommodation of the fastener.

With these and other objects in view, the invention consists in certain novel features of construction as hereinafter shown and described and then specifically pointed out in the claims, and in the drawings illustrative of the preferred embodiment of the invention.

Figure 1:
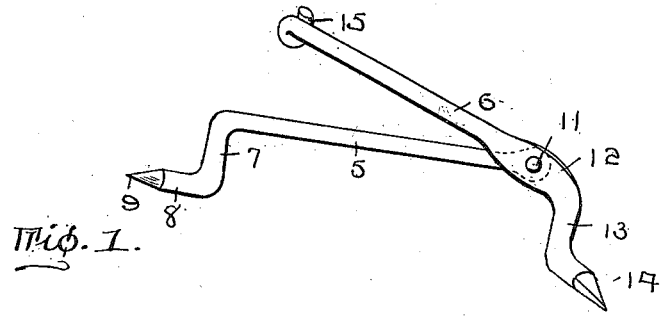
Figure 1 represents a perspective view of the improved pipe fastener.
Figure 2:
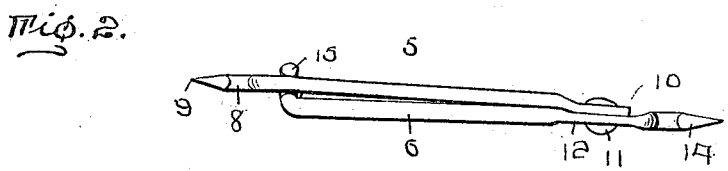
Fig. 2 represents a plan view thereof.
Figure 3:
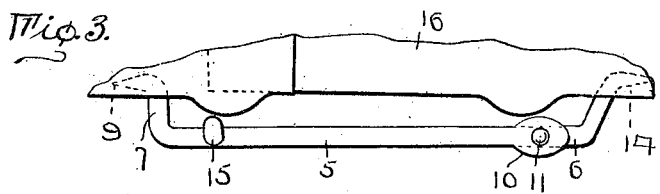
Fig. 3 represents a side elevation of the fastener applied to the adjacent ends of pipe sections.

Referring to the drawing in detail, wherein similar reference numerals designate corresponding parts throughout the several views the numerals 5 and 6 indicate generally the companion parts of the fastener which are preferably constructed of wire possessing a requisite degree of resiliency to permit the necessary flexure thereof, the member 5 consists of an elongated shank having one terminal offset as indicated at 7 and extended in parallel relation to the shank as at 8 and provided at its extremity with a penetrating point 9. The opposite terminal of the shank 5 is flattened as indicated at 10 to increase the resiliency thereof in one direction and is pivotally connected by a rivet or other fastening element 11 with the flattened medial portion 12 of the shank of the other member 6.

One terminal of the member 6 is offset as at 13 similarly to the offset terminal of the shank 5 and is provided with a penetrating point 14, whereas the opposite terminal of the shank 6 is provided with a laterally projecting hook 15 so arranged as to partially embrace the shank 5, when the parts of the fastener are moved to operative position, to maintain the parts of the fastener in alinement and to prevent accidental separation of the shanks.

In applying the invention to use, the shanks 5 and 6 are swung into proper angular relation and are used in the manner of a compass in marking the adjacent portions of two telescopically engaged pipe sections 16. The sections of the pipe are subsequently perforated at the points marked thereon with a suitable perforating instrument or, if preferred, either pointed terminal of the fastener may be utilized for this purpose. To facilitate the formation of openings in the pipe sections to receive the terminals of the fastener, the latter are preferably polygonal in cross section, as suggested in Fig. 1 whereby they may be operated in the manner of a reamer to enlarge the perforations to such extent as to accommodate the offset terminals of the fastener. This may be readily accomplished by swinging one of the shanks at right angles to the other and grasping one of them in the hand, thus disposing the other shank for convenient use in operating upon the pipe. Subsequent to the perforation of the pipe sections the pointed extremity 9 of the shank 5 is inserted in the pipe and is disposed in such position that the shank is disposed in substantially parallel relation thereto. The other shank 6 is subsequently swung into angular relation to the shank 5 until the pointed terminal thereof is so disposed as to enter the other hole in the adjacent pipe section, whereupon the last mentioned terminal is inserted in the pipe and the shanks 5 and 6 are swung together. By spreading the portions of the shanks apart the hooked terminal 15 is permitted to pass the shank 5 and being engaged behind and partially embracing the shank 5 effectively maintains the parts of the fastener in alinement and also the sections of the pipe.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

1. A fastener for stove pipes including a pair of pivotally connected shanks provided with offset ends terminating in penetrating points located outwardly of the offset shank portions of a hook carried by one shank adapted to engage the other shank to maintain the shanks in alinement, said shanks being resilient and capable of separation to permit the hook to pass said other shank.

2. A stove pipe fastener including a pair of shanks each having an offset penetrating point, means pivotally connecting the inner terminal of one shank with the other shank at a point on the latter inwardly of the offset terminal, and a laterally projecting hook carried by the last mentioned shank adapted to partially embrace the first mentioned shank to prevent accidental separation of the shanks, said shanks being formed with resilient material permitting separation thereof for facilitating disengagement of the hooked terminal of one shank from engagement with the other shank.

In testimony whereof, I affix my signature hereto.

JOHN PHILIP KIPP.